(12) United States Patent
Golub et al.

(10) Patent No.: US 8,194,170 B2
(45) Date of Patent: Jun. 5, 2012

(54) AXICON LENS ARRAY

(75) Inventors: Ilya Golub, Ottawa (CA); Brahim Chebbi, Sudbury (CA)

(73) Assignee: Algonquin College, Ottawa (CA)

( * ) Notice: Subject to any disclaimer, the term of this patent is extended or adjusted under 35 U.S.C. 154(b) by 379 days.

(21) Appl. No.: 12/476,746

(22) Filed: Jun. 2, 2009

(65) Prior Publication Data

US 2010/0302396 A1    Dec. 2, 2010

(51) Int. Cl.
G02B 13/16    (2006.01)
G02B 13/18    (2006.01)
F21V 5/02    (2006.01)

(52) U.S. Cl. ......... 348/335; 359/708; 359/709; 362/339

(58) Field of Classification Search .................. 359/708, 359/709; 348/335; 362/339
See application file for complete search history.

(56) References Cited

U.S. PATENT DOCUMENTS

| | | | |
|---|---|---|---|
| 4,937,715 | A | 6/1990 | O'Shea |
| 5,583,342 | A | 12/1996 | Ichie |
| 6,285,443 | B1 | 9/2001 | Wangler |
| 6,791,935 | B2 | 9/2004 | Hatano |
| 2006/0050409 | A1 | 3/2006 | George |
| 2006/0082882 | A1 | 4/2006 | Wang |

FOREIGN PATENT DOCUMENTS

| JP | 2003297727 A | * | 10/2003 |
|---|---|---|---|
| JP | 2006130691 A | * | 5/2006 |

OTHER PUBLICATIONS

Shao, "Dynamically adjustable annular laser trapping based on axicons" Sep. 1, 2006 vol. 45. No. 25 / Applied Optics, 8 pages.
Golub, "Fresnel axicon" Optics Letters, vol. 31, No. 12 / Jun. 15, 2006, 3 pages.
Druart et al "Demonstration of image-zooming capability for diffractive axicons" Optics Letters / vol. 33, No. 4/ Feb. 15, 2008, 3 pages.
Ding et al, "Hight-resolution optical coherence tomography over a large depth range with an axicon lens", Optic Letters, vol. 27, No. 4, Feb. 15, 2002, 3 pages.
Sochacki, "Phase retardation of the uniform-intensity axilens", Optics Letters / vol. 17, No. 1, Jan. 1, 1992, 3 pages.
Botcherby,, "An optical technique for remote focusing in microscopy", Optics Communications 281 (2008) 880-887, Oct. 3, 2007, 8 pages.
Belanger, "Ring pattern of a lens-axicon doublet illuminated by a Gaussian beam", Applied Optics/ vol. 17, No. 7 / Apr. 1, 1978, 7 pages.
Rioux, "Linear, annular, and radial focusing with axicons and applications to laser machining", Applied Optics / vol. 17, No. 10 / May 15, 1978, 5 pages.

* cited by examiner

*Primary Examiner* — Scott J Sugarman
(74) *Attorney, Agent, or Firm* — Michael Haynes PLC; Michael N. Haynes

(57) ABSTRACT

An optical lens array for imaging and illumination applications is provided. The lens array comprises a first axicon at a first end of the array, a second axicon positioned distally from the first axicon along an optical axis and a third axicon positioned distally from the second axicon along the optical axis. The third axicon provides an objective lens to a focal region or focus region. The third axicon is positioned at a fixed location in the array wherein the distance between the first and second axicons can be altered to control the position of the focal region defined by the depth of field for imaging applications and depth of focus for illumination applications of the third axicon.

19 Claims, 6 Drawing Sheets

AXICON LENS ARRAY

TECHNICAL FIELD

The present disclosure relates to the field of optics, in particular a lens array possessing a large depth of field and possessing a large range of focusing distance.

BACKGROUND

Optical imaging is one of the cornerstones of modern technology. One of the outstanding problems in the field is the limited depth-of-field (DOF) of imaging systems and limited range of focusing distance of illumination systems. DOF will be used to indicate both DOF for imaging applications and range of focusing distance for illumination applications.

In general solutions that increase DOF can be cumbersome; they involve relative motion of component parts (such as lenses) or substitution of parts into and out of an apparatus such as a camera or a light source fixture for illumination. Many methods have been proposed to increase DOF of imaging systems. These include: increasing the f-number of optics by reducing it's aperture, 'annular aperture' methods, in which focal depth is extended by obstructing the center part of light; 'shade mask' methods, in which focal depth is extended by modulation of the amplitude transmittance over the whole pupil aperture; 'quasi-bifocus' methods, in which focal depth is extended by the generation of bifocus; and image-processing methods. Apparatus using these methods suffer from disadvantages such as loss of incident light energy and reduction of imaging resolution.

Accordingly, an apparatus that posses inherently high DOF remains highly desirable.

SUMMARY

In accordance with the present disclosure there is provided an optical lens array comprising: a first axicon at a first end of the lens array; a second axicon positioned distally from the first axicon along an optical axis; a third axicon positioned distally from the second axicon along the optical axis providing an objective lens to a focal region for imaging applications or focus region for illumination applications, the third axicon being positioned at a fixed location in the lens array; and wherein the distance between the first and second axicons can be altered to control a position of the focal region defined by the depth of field for imaging applications and depth.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
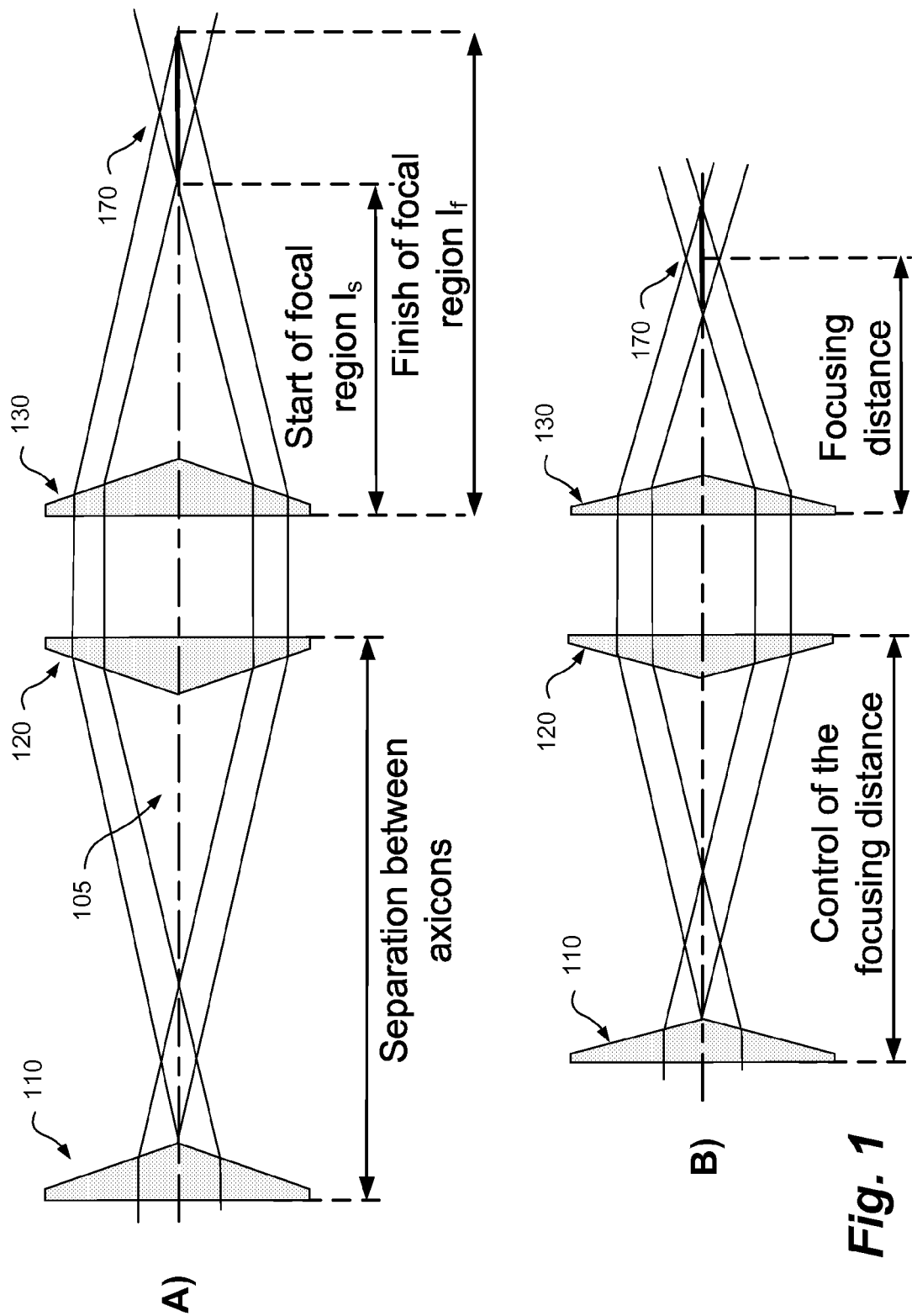
FIGS. 1A & B show a representation of adjustable focusing lens array.

Embodiments are described below, by way of example only, with reference to FIGS. 1-6.

The present disclosure pertains to a lens array comprising three lenses, positioned along a light path. The lenses of the apparatus are axicon lenses—also called 'cylindrically symmetric prisms' or 'conical lenses'. An axicon is a specialized type of lens which has a conical surface. An axicon images a point source into a line along the optic axis, or transforms a laser beam into a ring. It can be used to turn a Gaussian beam into an approximation to a Bessel beam, with greatly reduced diffraction. The above mentioned properties of axicons differentiate them from the more widely used spherical lenses which have a shorter depth of field and a Gaussian (diffracting) transverse distribution. These aspects of axicons make them attractive for some applications which could benefit from an extended depth of field. A Fresnel version of the axicon lenses can also be utilized, it has the advantage of very low bulk absorption and could be beneficial in reducing the size and cost of these lenses when needed.

The three axicon lens array configuration disclosed has several advantageous properties such as a large DOF (or focusing range) that can be conveniently controlled by moving only one lens, while the two other lenses remain fixed in space. The lens array also enables a 'remote focus control' capability because the focusing distance of the lens array can be modified in such a way that the lens proximal to the object being imaged or illuminated (the 'objective lens') can remain fixed in space. This is particularly useful in applications such as medical or industrial applications when the objective lens, the individual lens in a lens array which is positioned nearest (proximal) to the object being imaged or illuminated, is situated inside objects such as the human body or machinery and for which motion of the objective lens should be minimized to avoid damage to the medium or to the lens.

FIGS. 1A & B show a representation of adjustable focusing axicon lens array. The lens array produces a variable position, extended DOF that is controllable with an ability to be conveniently focused. The array comprises three axicons, two axicons, 110, 120 having the same base angle and an adjustable separation between them, producing an annular beam, propagating in free space or other optical medium such as a fiber optic cable, focused by a third, fixed axicon 130, providing an objective lens, generating a focused spot with a controllable DOF that is much larger than the DOF of a typical lens. The focal distance depends on the diameter of the annular beam which can be controlled by varying the distance between the first and second axicons 110, 120. The lens array enables flexible design and deployment in a range of illumination and imaging applications. For example, in applications where the lens array is utilized remotely in a confined space such as in an endoscope, simplicity and minimal adjustment of the lens array components that will be positioned internally to an object are beneficial. The first and second axicons 110, 120, referred herein as external axicons, are provided at one end of the enclosure, with the third axicon 130 being positioned remotely at the other end, referred herein as the internal axicon which is inserted into an object or body. The external axicons enable the device to be focused from outside the enclosure or object, remotely from the third internal axicon (or objective lens) without the need to fine tune the movement of the head of the internal optical device and its lenses to focus on a certain region inside an object in which the device is inserted. In illumination application, the third axicon can remain in a fixed position with only the movement of the first or second axicons required to adjust focus simplifying design. Thus, the lens array allows a simple and inexpensive adjustable focus capability applicable to a number of illumination and imaging applications.

The axicons are aligned along an imaging or optical axis 105 with a first axicon 110 having it's apex or vertex facing towards the apex of a second axicon 120. The base of a third axicon 130 faces the base of the second axicon 120 in a fixed position relative to the third axicon 130. The third axicon 130 is the objective lens, the individual lens in a lens array which is positioned nearest (proximal) to the object being imaged or illuminated. As shown in FIG. 1A, the distance between first axicon 110 and second axicon 120, identified as the external axicons, defines the focal region for imaging or illumination of the third axicon 130, the objective lens. The movement of the first axicon 110 relative to second axicon 120, defines a start of the focal region $l_s$ and a finish of the focal region $l_f$. As shown in FIG. 1B, as the first axicon 110 is moved towards the second axicon 120, the focusing region 170 is moved closer to the third axicon 130 changing the focusing distance. The movement of the first axicon 110 enables the depth of field (DOF), the axial distance over which the lens array is capable of focusing, to be moved in a convenient manner by minimizing the range or complexity of any relative motions of components needed to modify the DOF. Alternatively, the first axicon 110 may be in a fixed position with the second axicon 120 moving axially within the lens array to achieve the desired DOF. The unique configuration enables the apparatus to be applicable to a range of imaging and illumination applications including but not limited to microelectronics, compact digital cameras, microscopy, medical imaging, and optical storage.

Figure 2:
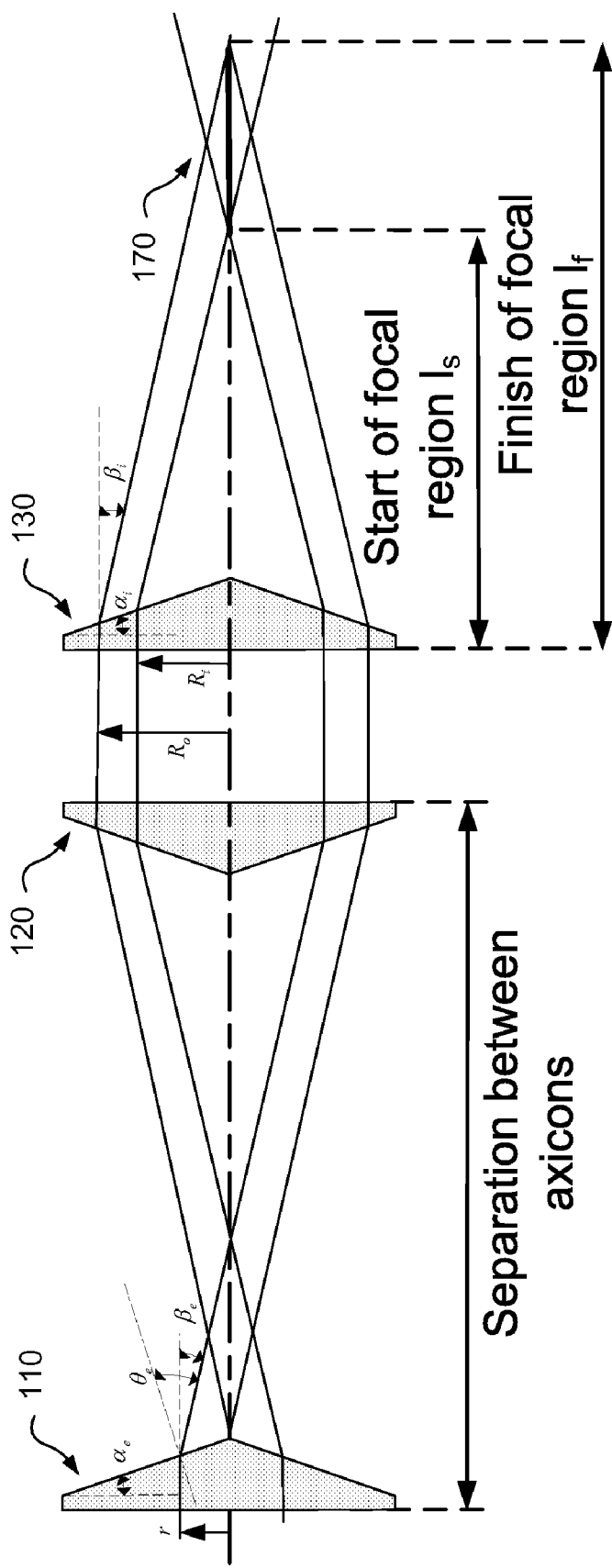
FIG. 2 shows a representation of the geometry of the adjustable focusing lens array.

FIG. 2 shows a representation of the geometry of the externally adjustable focusing lens array. By referring to FIG. 2 and from Snell's law, the angle β a beam makes with the axis of an axicon with a base angle α is:

$$\beta = \arcsin(n \sin \alpha) - \alpha \quad (1)$$

The outer and inner radii of the annular ring produced after the second axicon 120 are given, respectively, by $$R_o \approx s \tan \beta_e, R_i = R_o - r \quad (2)$$

In the expression of $R_o$ the thickness of the axicon is neglected compared to the separation s and r is the incident beam radius.

By making the same assumption for the third axicon, the location of the focal region of the third axicon is defined by its starting and finishing positions, $l_s$ and $l_f$, given by:

$$l_s = \frac{R_i}{\tan \beta_i}, \quad (3)$$

$$l_f = \frac{R_o}{\tan \beta_i}$$

The depth of field of the third axicon 130 is given by $$\omega = l_f - l_s = \frac{r}{\tan \beta_i} \quad (4)$$

The mean location of the focal region 170 is given by $$l = \frac{l_f + l_s}{2} = \frac{s \tan \beta_e}{\tan \beta_i} - \frac{r}{2 \tan \beta_i} \quad (5)$$

A change of the separation of the external axicons 110 & 120 would correspond to a change of the location of the focal region given by $$\Delta l = \frac{\tan \beta_e}{\tan \beta_i} \Delta s \quad (6)$$

Finally, an important property which determines the radial resolution is the spot size of the focused beams. As mentioned previously the intensity distribution obtained from an axicon is given by a zero order Bessel function. The spot size is usually defined by the location of the first zero, and is given by $$\rho_0 = \frac{2.405 \lambda}{\pi \sin \beta} \quad (7)$$

For small base angle of the axicons α and assuming the thickness of the axicons is small compared to the distance s, the mean focal length l of the internal axicon is given by $$l = \frac{R}{\alpha_i \times (n_i - 1)} = s \times \frac{\alpha_e \times (n_e - 1)}{\alpha_i \times (n_i - 1)} \quad (8)$$

where subscripts i and e refer to the internal and external axicons, respectively, R is the mean radius of the light ring generated after the second axicon, s is the distance between the external axicons, and $n_{i,e}$ is the index of refraction of corresponding axicon. Eq. 8, similar to eq. 6, exhibits that the displacement Δl of the focal position of the third axicon is proportional to the change of the distance between the first two axicons, Δs, magnified by the ratio of the external to internal axicon angles and by the ratio of their refractive indices.

Figure 3:
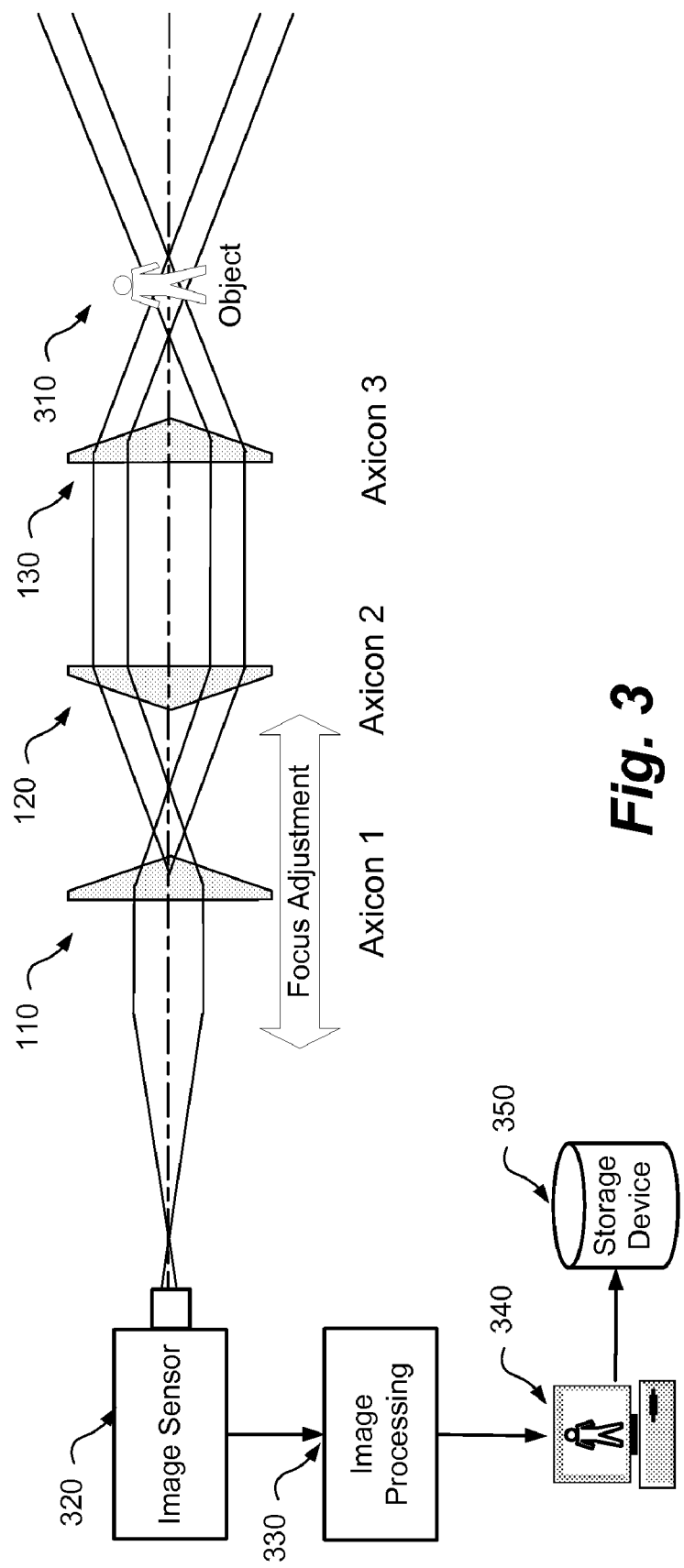
FIG. 3 shows an imaging application of the lens array.

FIG. 3 shows an imaging application of the lens array. The apparatus may be utilized in a range of imaging applications such as mobile devices to optical coherence tomography where an improved depth of field is beneficial. For imaging applications, the three axicon lens array 110, 120, 130 is coupled to an imaging sensor 320 such as, but not limited, to a CCD (charge-coupled device) sensor, a computer imaging device, or a DSP (digital signal processor) that reconstructs the image produced by the lens array. Reconstruction is needed because axicon lenses produce images that contain defocused light/light with overweight amount of low spatial frequency components which may be processed by an image processing module 320. The image processing module may be implemented as part of the imaging sensor 320 or as part of a display device 340 or capture device. The resultant images can then be stored in a storage device 350. In the imaging configuration, the object to be imaged 310, is positioned within the depth of focus of the array. The first axicon 110 is adjusted to move the object 310 into focus. The image is processed by processing module 330, as described in connection with FIG. 4, for display.

Figure 4:
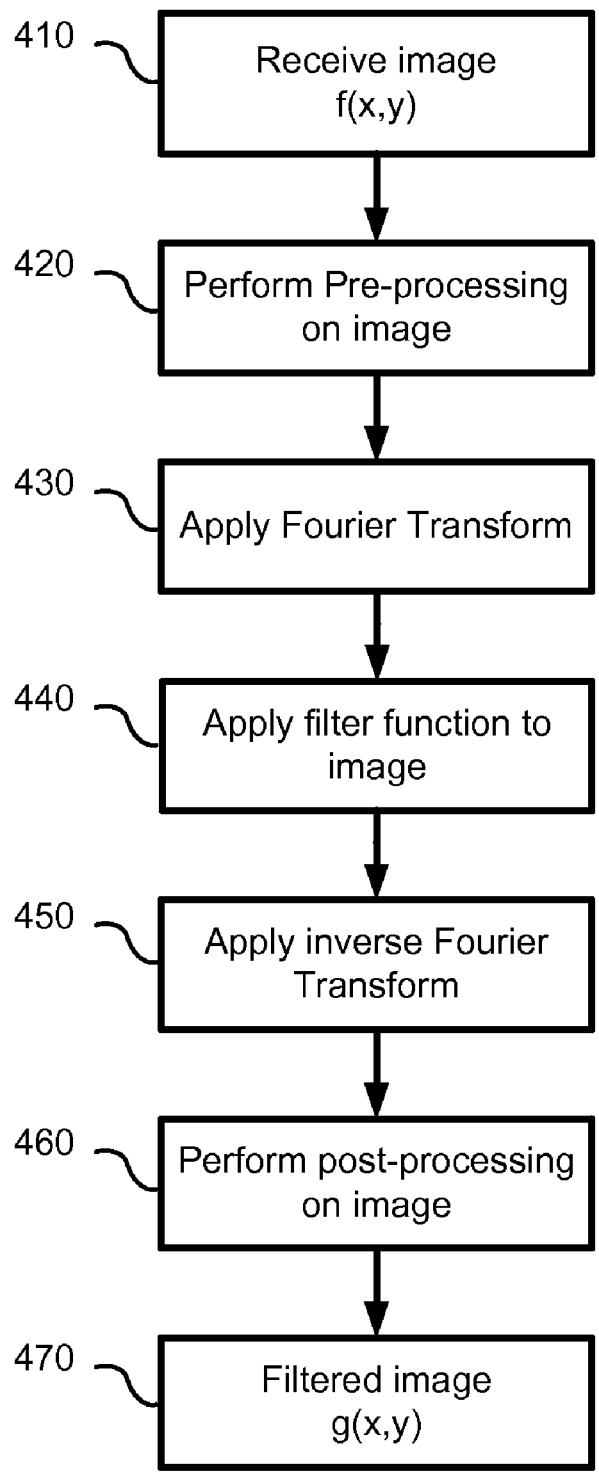
FIG. 4 shows a method for processing images received by the lens array.

FIG. 4 shows a method for processing images received through the lens array as shown in connection with FIG. 3 to remove noise/aberrations introduced by the axicons. The image f(x,y) is received 410 from an imaging sensor 320, at an imaging processor 330. Pre-processing is performed including contrast enhancement and edge enhancement of the image at 420. A Fourier transform is applied to the pre-processed image at 430 in the frequency domain. At 440 a filter function is applied using high pass frequency filters such as but not limited to Wiener or homomorphic filters to reduce noise and to simultaneously normalize the brightness across an image and increase the contrast. The inverse Fourier transform is then applied at 450. Further post-processing is performed such as contrast enhancement at 460. The resulting filtered image g(x,y) is provided at 470.

Figure 5:
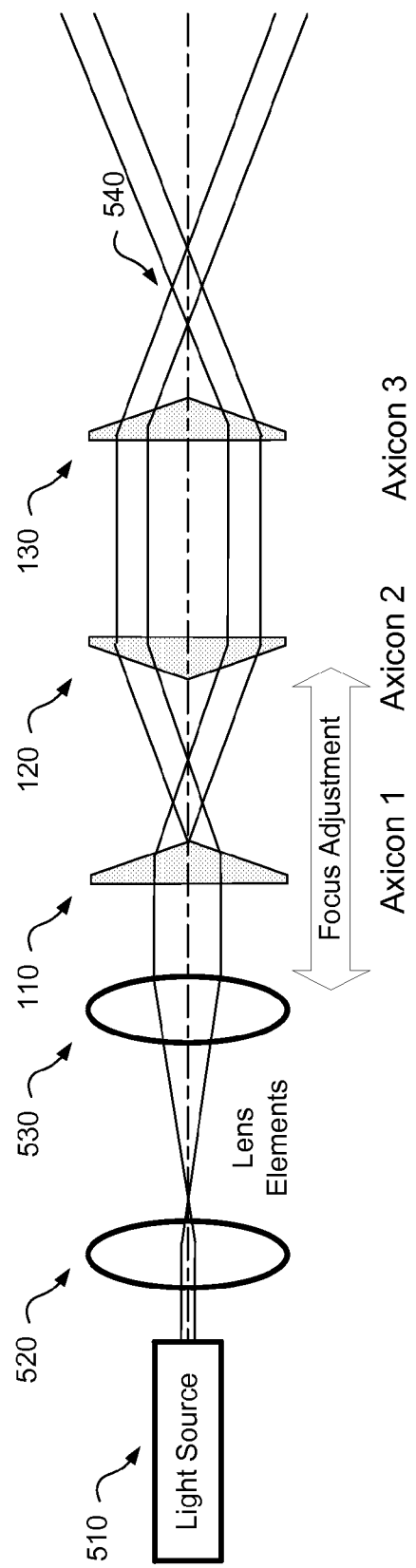
FIG. 5 shows an illumination application of the lens array.

FIG. 5 shows an illumination application of the apparatus. In illumination mode, the three axicon lens array 110, 120, 130 can be used to produce light beams with large inherent range of focusing distance. This is useful for illumination of objects which may move in an axial direction, i.e. parallel to the direction of the beam (closer or farther from the light source). An example is when a person wishes to read a book or other written media while changing posture. Similarly, the remote focus property enables a convenient means to modify the focusing distance without moving the objective lens or 'proximal' lens. The light source 510, such as a laser/gaussian beam or a white source/plane wave such as incandescent, fluorescent light source, or LED can be magnified through one or more lens elements 520 and 530 providing a nearly collimated beam prior to being received by axicon 110. The received light then passes through the lens array and is then provided in an adjustable focus region 540. For a plane (Gaussian) incoming wave, by choosing the third axicon to be a logarithmic (Gaussian) axicon instead of a classical one the intensity along the focal segment can be made constant; similarly one can modify the first two axicons or choose another type for the third axicon to generate a required intensity distribution along the focal segment (which does depend on the type of the source, as it can be a plane wave, a gaussian beam etc.). All these modifications can be achieved by engineering the phase response (i.e. the sag or thickness as function of radius) of the axicon.

Figure 6:
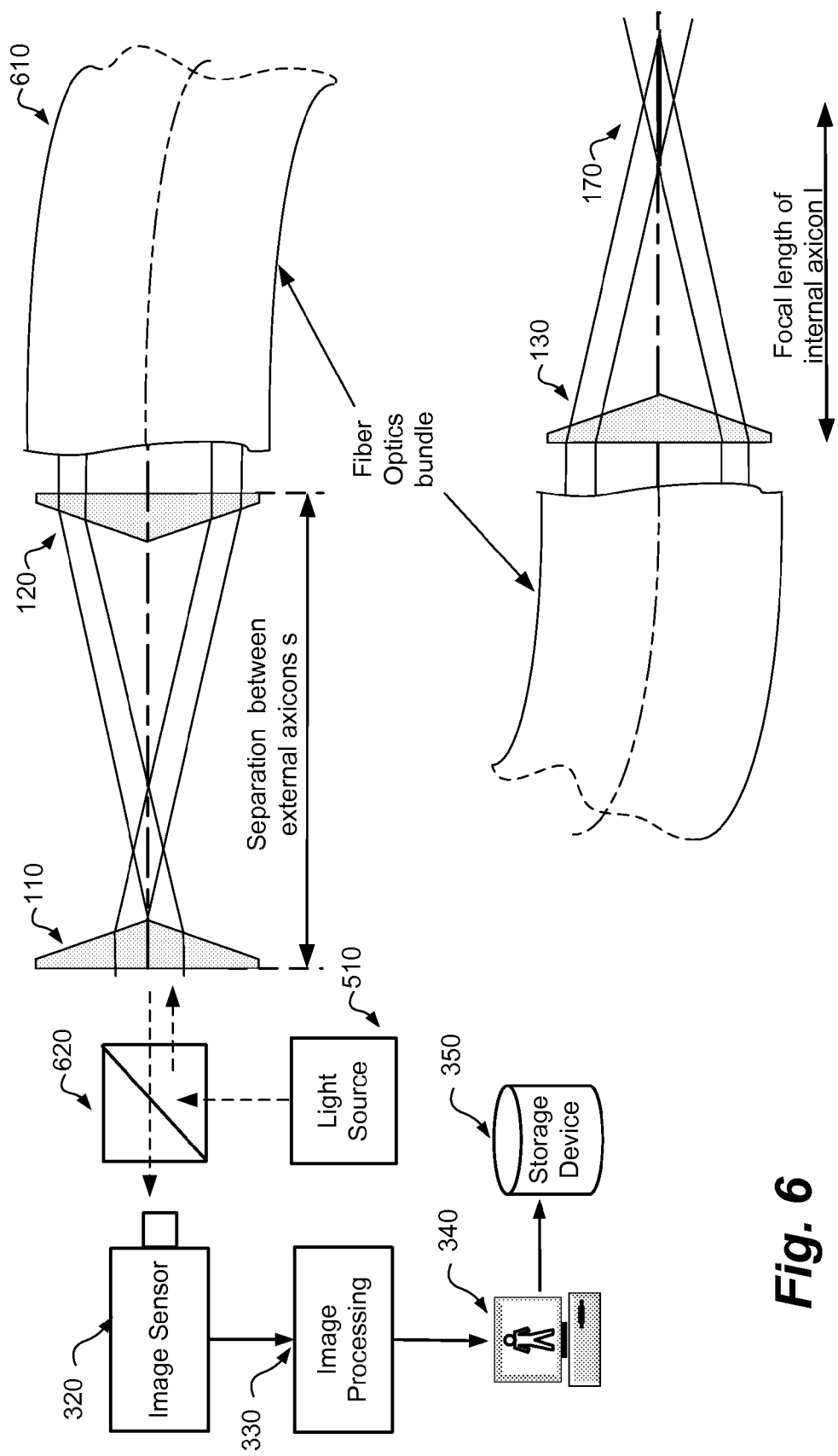
FIG. 6 shows an imaging and illumination application of the lens array.

The lens array as shown in FIG. 3 can be utilized for imaging applications but can be combined with illumination applications as shown in FIG. 5 for combined applications such as required in an endoscope apparatus. FIG. 6 shows a combined imaging and illumination application of the lens array. The combination of imaging and illumination is useful in medical imaging such as for endoscopic procedures such as laparoscopic surgery, colonoscopy and gastroscopy, where optical access is required to conduct the procedures. Usually, the head of the endoscope is equipped with a light emitting device and a camera or vision lenses in the case of fiber endoscopes. The head may also contain other devices such as a suction orifice for water and blood and possibly biopsy tools. In general, the surgeon performs the insertion of the endoscope tube by pushing it manually and relies on the vision system to avoid touching the organs and tissue walls. A bending section at the head of the endoscope is operated through the control handle outside the patient's body and facilitates navigation.

The lens array provides a simple and inexpensive adjustable focus capability for applications like endoscopy. The axicon configuration provides the ability to focus from outside the patient body, without the need to fine tune the movement of the head of the internal optical device and its lenses to focus on a certain region inside. A light ring generated by two identical external axicons is transmitted through a fiber optics bundle. The use of an imaging sensor 320 and light source 510 is enabled by a beam splitter 620 to separate light going from the source from the received light going to the image sensor 320 along the optical path. Alternatively, illumination can be provided by a separate parallel channel. The third axicon can be distally spaced by an optical medium such as an optical fibre 610 to provide flexibility while maintaining the focus capability. In endoscopes, the first and second axicon would be positioned at an external end, enabling remote focusing and control. The focal distance depends on the diameter on the ring which can be controlled from outside by varying the distance between the two external axicons. The internal axicon is used at the head of the device to produce the focal region.

It should be noted that each axicon as shown in FIGS. 1-6 has its apex oriented either toward the left side or the right side of the figure. The specific orientation illustrated is preferred in certain situations, particularly for axicons possessing large base angles. In other cases, particularly where the axicon in questions possesses small base angle (i.e. close to 180 degrees apex angle) the orientation is not relevant and the lens could be reversed in orientation relative to the figures (i.e. with apex facing the opposite direction to that shown) without appreciable loss of performance. This issue of lens orientation is well understood in the art and finds direct analogy in ordinary compound lenses that incorporate conventional, non-axicon lenses.

The invention claimed is:

1. An optical lens array comprising:
a first axicon at a first end of the lens array; a second axicon positioned distally from the first axicon along an optical axis, the second axicon is at a fixed position in the lens array, and the first axicon can be moved axially along the optical axis relative to the second axicon;
a third axicon positioned distally from the second axicon along the optical axis providing an objective lens to a focal region for imaging applications or focus region for illumination applications, the third axicon being positioned at a fixed location in the lens array; and
wherein the distance between the first and second axicons can be altered to control a position of the focal region defined by the depth of field for imaging applications and depth of focus for illumination applications of the third axicon.

2. The lens array of claim 1 wherein the first axicon apex side faces the second axicon apex side and the third axicon base side faces the second axicon base side when each of the axicons has large base angles.

3. The lens array of claim 1 wherein the position of the first axicon is at fixed position in the lens array, and the second axicon is movable axially along the optical axis relative to the first axicon.

4. The lens array of claim 1 wherein one or more of the axicons are selected from a group comprising Fresnel axicon, logarithmic axicon, and Gaussian axicon.

5. The lens array of claim 1 wherein the diameter of the first axicon is less than the diameter of the second and third axicons.

6. The lens array of claim 1 wherein the first axicon is coupled to an imaging sensor.

7. The lens array of claim 6 wherein the imaging sensor is one of a charged coupled device (CCD), a computer sensor, or a digital signal processor (DSP).

8. The lens array of claim 7 wherein the image received by the imaging sensor is processed to filter the received image.

9. The lens array of claim 8 wherein an image received from the first axicon is processed by performing:
pre-processing of the image to adjust contrast levels;
applying a Fourier transform to the image;
applying a filter function to reduce noise;
applying an inverse Fourier transform; and
post-processing on the image.

10. The lens array of claim 1 wherein the first axicon is coupled to a light source for provide light through the third axicon.

11. The lens array of claim 10 wherein the light source is coupled to the first axicon by one or more lens elements providing magnification of the light source.

12. The lens array of claim 11 wherein the light source is a laser/gaussian beam or a white source/plane wave such as incandescent, fluorescent light source, or light emitting diode (LED).

13. The lens array of claim 1 wherein the first axicon is coupled to a light source and an imaging sensor through a beam splitter to provide light through the lens array to an object external to the third axicon and to receive an image from the object to the imaging sensor.

14. The lens array of claim 13 wherein the second and third axicons are coupled by a fiber optical cable, the first and second axicon being external axicons and the third axicon being an internal axicon.

15. The lens array of claim 14 wherein the imaging sensor is one of a charged coupled device (CCD), a computer sensor, or a digital signal processor (DSP).

16. The lens array of claim 15 wherein the image received by the imaging sensor is processed to filter the received image.

17. The lens array of claim 16 wherein an image received from the first axicon is processed by performing:
pre-processing of the image to adjust contrast levels;
applying a Fourier transform to the image;
applying a filter function to reduce noise;
applying an inverse Fourier transform; and
post-processing on the image.

18. The lens array of claim 1 wherein the mean focal length l of third axicon is given by:

$$l = \frac{R}{\alpha_i \times (n_i - 1)} = s \times \frac{\alpha_e \times (n_e - 1)}{\alpha_i \times (n_i - 1)}$$

where subscripts i and e refer to the internal and external axicons respectively, R is the mean radius of the light ring, s is the distance between the external axicons, $\alpha$ is the base angle of the axicon assumed to be small and n is the index of refraction.

19. The lens array of claim 1 wherein the mean focal length l of third axicon is given by:

$$l = \frac{s\tan\beta_e}{\tan\beta_i} - \frac{r}{2\tan\beta_i}$$

where subscripts i and e refer to the internal and external axicons respectively, r is the incident beam radius, s is the distance between the external axicons, $\beta$ is the base angle of the axicon.

* * * * *